United States Patent
Ernst et al.

(10) Patent No.: US 6,575,132 B1
(45) Date of Patent: Jun. 10, 2003

(54) DIRECT INJECTION, SPARK IGNITION INTERNAL COMBUSTION ENGINE

(75) Inventors: Johannes Ernst, Baden-Baden (DE); Benedikt Ganz, Elchesheim-Illingen (DE); Rolf Klenk, Stuttgart (DE); Klaus Rössler, Altbach (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/936,338
(22) PCT Filed: Mar. 10, 2000
(86) PCT No.: PCT/EP00/02078
§ 371 (c)(1), (2), (4) Date: Jan. 28, 2002
(87) PCT Pub. No.: WO00/55481
PCT Pub. Date: Sep. 21, 2000

(30) Foreign Application Priority Data

Mar. 12, 1999 (DE) .......................... 199 11 023

(51) Int. Cl.⁷ ................................................ F02B 17/00
(52) U.S. Cl. ...................... 123/295; 123/301; 123/305
(58) Field of Search ................. 123/305, 298, 123/295, 301

(56) References Cited

U.S. PATENT DOCUMENTS

| | | |
|---|---|---|
| 4,790,270 A | 12/1988 | McKay et al. |
| 5,170,758 A * | 12/1992 | Chmela .......... 123/276 |
| 5,327,864 A | 7/1994 | Regueiro |
| 5,577,473 A | 11/1996 | Linder |
| 5,813,385 A * | 9/1998 | Yamauchi et al. .......... 123/276 |
| 5,915,349 A * | 6/1999 | Biemelt et al. ............. 123/162 |
| 6,158,409 A * | 12/2000 | Gillespie et al. ......... 123/193.6 |
| 6,276,338 B1 * | 8/2001 | Kato et al. ................ 123/41.31 |

FOREIGN PATENT DOCUMENTS

| | | |
|---|---|---|
| DE | 195 46 945 | 6/1997 |
| DE | 196 42 653 | 1/1998 |
| DE | 197 49 295 | 5/1999 |
| EP | 0 835 994 | 4/1998 |
| GB | 2 323 633 | 9/1998 |

* cited by examiner

Primary Examiner—Erick Solis
(74) Attorney, Agent, or Firm—Kenyon & Kenyon

(57) ABSTRACT

In a direct injection internal combustion engine with a combustion chamber which is delimited in each cylinder by a longitudinally movable piston and by the inner wall of a cylinder head, an injector injects fuel into the combustion chamber in order to form an ignitable fuel/air mixture with combustion air that is supplied separately, the mixture being ignited by a spark plug. The fuel is injected in a conical shape and the electrodes are protected from being wetted by fuel and from coking if they are located outside the lateral surface of the cone of fuel produced by the injection nozzle. In order to bring an ignitable mixture between the electrodes and to ensure an optimal operating performance of the internal combustion engine by improving the combustion process, the combustion chamber is configured so that the cone of fuel is injected in a free jet that is substantially unaffected by the perimeter of the combustion chamber, and the electrodes of the spark plug project inside a fuel vortex which emerges from the lateral surface during injection.

21 Claims, 3 Drawing Sheets

DIRECT INJECTION, SPARK IGNITION INTERNAL COMBUSTION ENGINE

FIELD OF THE INVENTION

The present invention relates to a direct injection gasoline engine,

BACKGROUND INFORMATION

In direct injection gasoline engines, a combustion chamber is delimited in each cylinder by a longitudinally movable piston and by the inner wall of a cylinder head, an injector injecting fuel into the combustion chamber in order internally to form a fuel/air mixture with combustion air that is supplied separately. The composition of the fuel/air mixture must be within the ignitable window in the area of the spark plug in order to be ignitable by an ignition spark, which is triggered between the electrodes of a spark plug.

U.S. Pat. No. 5,577,473 describes an injection nozzle for direct introduction of fuel or fuel-air mixture in a combustion chamber of an internal combustion engine. The injection nozzle includes a valve needle which opens to the outside, and between its valve head and a cone-shaped valve seat an umbrella-like injection jet is formed from fuel or fuel-air mixture, the lateral surface of which points toward the spark plug. The quantity of fuel that is introduced is metered so that the internal combustion engine is operated with a lean fuel-air mixture, the air/fuel ratio (lambda) of which is on average >1, a ring-shaped guide surface area being provided next to the valve seat in the outlet direction of the injection jet, which has a recess that deviates from the ring shape in an area that is oriented towards the spark plug.

European Published Patent Application No. 0 835 994 describes a direct injection internal combustion engine, which includes a shed roof-shaped combustion chamber and an injector arranged in the center, the electrodes of the spark plug being arranged near the intake valve. The fuel is injected in the form of a hollow cone into a piston, which includes a cavity with a circular-shaped projecting part, and the fuel impinges on the piston recess. The fuel which thus becomes sprayed is transported by a tumble flow to the electrodes of the spark plug, the circular-shaped projecting part of the piston recess preventing the sprayed fuel from being scattered in the direction of the cylinder wall, whereby a stable stratified charge combustion is ensured.

German Published Patent Application No. 195 46 945 describes a direct injection internal combustion engine, the injectors of which inject the fuel into the combustion chamber in a cone shape via their injection nozzles, the spark plug being arranged in such a way that its electrodes are outside of the lateral surface of the fuel cone generated by the injection nozzle. This arrangement prevents wetting of the electrodes with fuel during the injection operation and counteracts soot deposition on the electrodes because of incompletely burned fuel. The electrodes are free of coking over a long operating time period, whereby an orderly operation of the internal combustion engine without misfiring should be ensured. In order to bring the ignitable mixture between the electrodes arranged outside of the fuel cone, the spark plug is to be arranged in such a way that the ground electrode is at a small distance from the lateral surface of the fuel cone and the inner wall of the cylinder head extends parallel to the lateral surface of the fuel cone while forming a gap at least where the electrodes of the spark plug are arranged.

In the gap, a turbulent flow should be produced, which is composed of a fuel/air mixture and which extends into the area of the electrodes. In order to generate the turbulent flow, a special shape of the inner wall and an arrangement of the spark plug near the injector is necessary. The injector is arranged in a recess of the inner wall, i.e., set back from the free combustion chamber volume, whereby the mixture vortex is produced in the area adjacent to the injection nozzle and should circulate in the hollow space that is formed between the lateral surface of the fuel cone and the inner wall of the cylinder head in the area of the injection nozzle. Furthermore, air, which was displaced by the fuel that was injected into the combustion chamber, should flow back through the air gap between the fuel cone and the parallel, likewise cone-shaped inner wall of the cylinder head. During the return flow to the spark plug along the inner wall, additional small portions of the fuel should also be entrained from the fuel cone. The turbulent flow is formed so that it is sufficiently pronounced in the area near the injector, in order to bring an ignitable mixture between the electrodes of a spark plug. The spark plug must therefore be arranged near the injector.

In the conventional direct injection gasoline engines, the combustion chamber perimeter must be precisely designed at a high expense, especially through the inner wall of the cylinder head, in order to obtain the desired hydromechanical effects to form the ignitable mixture vortex. The conventional combustion chamber configuration with the combustion chamber shape necessary to form the mixture vortex and the spark plug necessarily arranged near the injector often cannot achieve optimum combustion or ensure the desired operating performance of the internal combustion engine.

It is an object of the present invention to provide a direct injection gasoline engine so that the internal combustion engine operates with optimum operating performance.

SUMMARY

In the combustion chamber configuration according to the present invention, the fuel cone is injected in a free jet that is substantially unaffected by the combustion chamber perimeter, i.e., the fuel cone is injected at a sufficiently large distance, in particular, from the inner wall of the cylinder head, that the cone-shaped fuel jet spreads out in the free combustion chamber volume substantially without hydromechanical wall effects of the combustion chamber perimeter. In the process, vortices of fuel emerging from the lateral surface of the cone form during the injection. These vortices are composed at first mainly of fuel vapor and mix with the surrounding combustion air in the combustion chamber. The fuel vortices form in a particularly pronounced manner if the cone angle of the fuel jet cone is between 70° and 110° and they are generated by an air flow that occurs in the area of the lateral surface of the fuel cone because of air entrained by the fuel jet, while an air flow is also generated in the opposite direction by the resulting vacuum. The spark plug is positioned according to the present invention so that the electrodes project into the fuel vortex of the free jet. For example, the spark position of the electrodes is 1 mm to 15 mm away from the lateral surface of the fuel cone.

The fuel vortex, which brings an ignitable mixture between the electrodes, forms on the lateral surface of the free jet without effective influence of the combustion chamber perimeter, so that the combustion chamber shape may be configured freely. A jet-guided combustion process is present in which wall effects of the inner wall of the cylinder head or possibly a piston cavity barely exert an influence on the mixture formation or the ignition. In particular, in the stratified charge operation of an internal combustion engine, when fuel is injected during the compression stroke and a central fuel cloud is formed when the combustion chamber is filled with air, an optimal burn-through of the combustion chamber charge may be achieved with a simple combustion chamber configuration. Another advantage of the mixture formation according to the present invention is that the spark plug may be arranged further away from the injector. The fuel vortex remains stable for a long time almost at the same position in the combustion chamber, so that ignition may occur independently of the injection point over a wide time interval.

The free fuel jet is injected, for example, into the combustion chamber in a hollow cone shape. In this manner, the fuel vortices form in a shape that is particularly suitable for the transport of the mixture to the spark plug, in particular, for injection at a high cylinder pressure in the compression phase during the stratified charging operation. In order to form the hollow cone jet, an injector with an injection nozzle that opens to the outside may be used. The injection nozzle may in this case be constructed so that the fuel emerges from the injector as perpendicularly as possible to the surface of the opening valve element, so as to counteract depositions and coking. Injection nozzles with swirl generators may be used or even injectors with two magnetic coils for moving the valve element opening to the outside. Also, injection nozzles that open to the inside, i.e., into the inner space of the injector may be provided, which generate a distinctive hollow cone jet. In this manner, a higher fuel concentration is produced on the edge of the jet with more than ⅔ of the entire injected amount in the outer third of the fuel cone. In order to form the hollow cone jet, injectors with multi-hole nozzles may also be used, the fuel openings of the multi-hole nozzle being arranged so that a hollow cone jet is formed from the individual jets passing through during fuel injection. Fundamentally, any injector that generates a distinctive hollow cone jet with its constructive design may be suitable for the fuel injection in a free jet according to the present invention.

In order to form a distinctive fuel vortex on the injection cone, the injector is arranged so that an angle between an axis of symmetry of the fuel cone and a cylinder axis of the cylinder is less than 25°. The injection nozzle may be at a distance of less than 20 mm away from the cylinder axis. The injector may be arranged centrally in the combustion chamber, the axis of symmetry of the injected fuel cone coinciding with the axis of the cylinder.

In another example embodiment of the present invention, two spark plugs are provided per cylinder. Through a double ignition, in which both spark plugs form ignition sparks, the risk of misfiring may be reduced. Also, under extreme operating conditions of the internal combustion engine, if possibly the fuel vortex transports too lean a mixture between the electrodes of a spark plug, ignition may still be ensured through the other spark plug. The two spark plugs may be arranged at equal distance from the injector in the combustion chamber. If the spark plugs with their respective ignition positions are located at different distances from the injector, then depending on the operating point of the internal combustion engine, the spark plug that is used for ignition may be the one more favorably positioned with regard to the formation of the fuel vortex. The position of the fuel vortex is affected by the counterpressure in the combustion chamber, so that the optimum spark position for ignition is variable in the characteristics map of the internal combustion engine depending on the operating conditions of the internal combustion engine, such as the injection time. In this manner, the ignition of the fuel vortex may be ensured in any case by one of the igniting spark plugs having different spark positions relative to the fuel cone.

A control unit may be provided which determines, as a function of the operating conditions, which of the two spark plugs is used to ignite the fuel/air mixture. In the process, depending on the operating mode (stratified charge or homogeneous mixture formation) and the operating conditions, the ignition at the most favorable ignition location is ensured, where the fuel vortices emerging from the fuel cone cover the corresponding spark plug.

The mixture formation in the combustion chamber may be improved by suitable steering of the inflowing combustion air. For example, the combustion air may be brought into the combustion chamber in a tumble motion, where the combustion air rotates in an approximately circular movement in a plane of the cylinder axis. Effective ignition is ensured in the process through the spark plug, which is arranged in a rear section of the flow path of the combustion air in the combustion chamber. In the case of a tumble flow with combustion air inflowing at first approximately parallel to the combustion chamber roof, the spark plug may be arranged in the area of the air admission, i.e., adjacent to the intake valve, for example, between two intake valves in multi-valve engines. In the case of reverse tumble flow, the spark plug may be correspondingly arranged on the outlet side. Furthermore, the mixture formation of the gasoline engine according to the present invention, with fuel injection in a free jet, may be improved through a swirl-shaped charging movement in the combustion chamber. With a swirling flow of the combustion air around the cylinder axis, asymmetries and skeins of the injected fuel jet may be reduced during the mixture formation and thus the ignition conditions may be improved in the area of the vortices that emerge on the fuel cone. The swirl may be generated by appropriately shaped intake channels, so-called swirl or spiral channels, through the offset of the intake valves or the rotated radial valve cluster or, in multi-valve engines, by switching off the valve or via adjustable throttle elements in the intake section.

The optimal cone angle of the fuel cone in the angle range between 70° and 110° for the formation of powerful fuel vortices in the jet edge area is dependent on the combustion chamber shape, in particular, on the setting angle of the valve axes of the gas exchange valves. In the case of a combustion chamber roof angle of 180°, the optimal jet angle of the fuel cone is approximately 90°. The cone angle of the fuel cone may be reduced by approximately 1° to 2° when the roof angle decreases by approximately 10°. Good mixture configurations are achieved in an acceptance range of approximately 20° above and below the theoretically optimum cone angle of the cone jet, i.e., in the angular range of approximately 70° to 110°.

Ignition may occur after the end of the injection operation approximately 0.1 ms to 1.5 ms after the end of injection.

DETAILED DESCRIPTION

Figure 1:
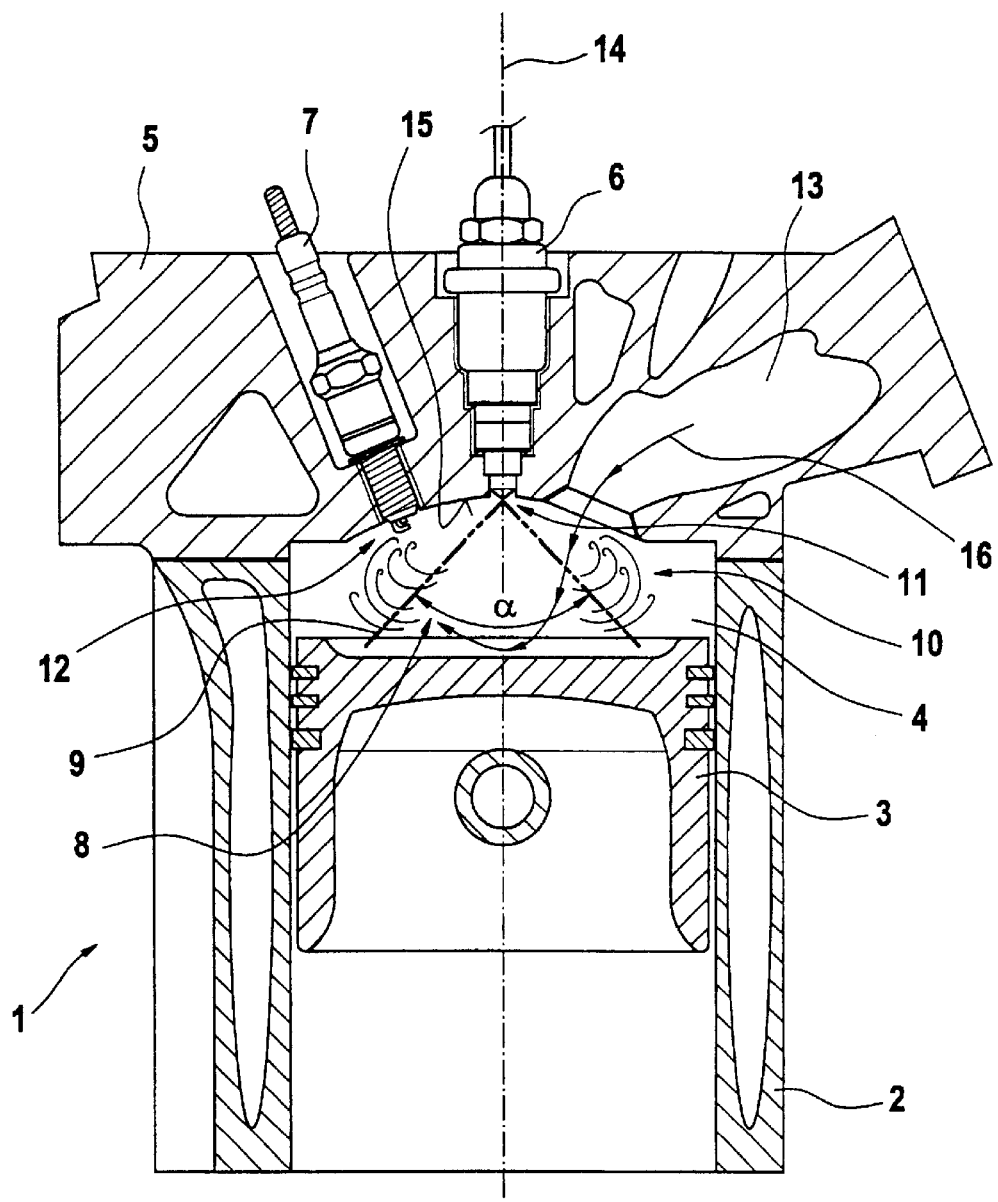
FIG. 1 is a longitudinal cross-sectional view through an internal combustion engine.

FIG. 1 illustrates a direct injection gasoline engine 1, in the cylinder 2 of which a piston 3 is arranged so that it is longitudinally movable and delimits a combustion chamber 4 with inner wall 15 of a cylinder head 5 set on cylinder 2. In cylinder head 5, a fuel injector 6 is arranged, which, arranged centrally on cylinder center axis 14 and aimed at piston 3, injects fuel directly into combustion chamber 4. Combustion air 16 required for the inner mixture formation is supplied through an intake channel 13 to combustion chamber 4. In cylinder head 5, an additional spark plug 7 is arranged, the electrodes 12 of which project into combustion chamber 4, an ignition spark being triggered between the electrodes 12 at the ignition time and penetrates combustion chamber 4 during the sparkover of the ignitable mixture.

Injector 6 includes an injection nozzle 11 that opens to the outside, which generates a fuel jet that expands toward the piston and has a hollow cone shape. Electrodes 12 of spark plug 7 are outside of lateral surface 9 of fuel cone 8 generated by injection nozzle 11 and thus are not wetted by fuel during injection.

The injector is actuated piezoelectrically, the injection nozzle 11 being opened and closed quickly and in a precisely adjustable manner by a piezo element. The formation of the desired free jet shape of the fuel cone results from suitable selection of the injection time and its precise observance during the operating cycle via the piezoelectric actuation of the injector.

The internal combustion engine operates in wide characteristics map ranges in stratified charge operation, the fuel being injected during the compression stroke of cylinder 2. Because of the late fuel injection during the operating cycle, a stratified combustion chamber charging occurs at locally different fuel concentrations, a very lean mixture formed and/or pure air being located outside of the fuel cone 8.

In order to bring an ignitable mixture between electrodes 12 of spark plug 7, the internal combustion engine includes a combustion chamber configuration of the type in which fuel cone 8 is injected in a free jet that is substantially unaffected by the combustion chamber perimeter by cylinder head inner wall 15. Lateral surface 9 of fuel cone 8 may be far away from inner wall 15, fuel vortices 10, which extend out of lateral surface 9, forming on the free jet that is unaffected by the wall effect of the combustion chamber perimeter. Cone angle α of fuel cone 8 is between 70° and 110°, fuel vortices 10 on the cone edge being produced in an particularly pronounced manner. Optimum cone angle a of fuel angle 8 is affected by the configuration of the combustion chamber, for example, by the contour of the cylinder head inner wall or also the orientation of the outlet and intake channels and the gas exchange valves, i.e., the flow direction of the combustion air in combustion chamber 4. For a flat inner wall having an angle of inclination of 0°, the optimal cone angle α is approximately 90°, with sufficiently powerful fuel vortices 10 being formed on the cone edge in an angular range of approximately 20° above and below the optimum cone angle α. With increasing slope of the combustion chamber perimeter through cylinder head inner wall 15, optimum cone angle α is reduced by approximately 1° to 2° for an approximately 10° increase in the inner wall inclination.

Fuel vortices 10 result because of an air flow in the area of lateral surface 9 of the fuel cone through air that is entrained with the fuel jet, an air flow in the opposite direction is also generated by the vacuum that is formed. Fuel vortices 10 transport fuel into combustion chamber areas that are far outside fuel cone 8, and they mix there with combustion air 16, which flows in a tumble flow into combustion chamber 4 in the direction of the arrow. In tumble flow, the combustion chamber charge moves in a plane that includes cylinder axis 14.

The spark plug is arranged so that electrodes 12 project into mixture vortex 10. Also, in the combustion chamber area positioned outside fuel cone 8, in which electrodes 12 are located protected from direct wetting by fuel, an ignitable mixture may be provided on spark plug 7 with fuel vortices 10 that are present during the free jet injection.

Fuel vortices 10 form substantially independently of the combustion chamber shape, and inner wall 15 of cylinder head 5 may thus be configured in any desired manner. The injection free jet has a hollow cone shape, a high portion of the entire fuel injection quantity being conducted in lateral surface 9 of cone jet 8 and may thus be covered by fuel vortices 10.

The ignition time can be varied and adjusted as necessary in a wide range substantially independently of the injection time, since the fuel vortices become pronounced in a stable manner over a longer time period and fuel is still present on spark plug 7 at approximately 50° crankshaft angle after the end of injection.

Because of the stability of fuel vortices 10 and the long time period that is available for ignition, spark plug 7 may be arranged relatively far away from injector 6 in the cylinder head, whereby the combustion chamber configuration and the constructive arrangement of the cylinder head 5 are considerably simplified. The distance of the spark position corresponding to the arrangement of electrodes 12 from the injection nozzle may be between 7 mm and 30 mm. The spark position is thus between 1 mm and 15 mm away from lateral surface 9 of fuel cone 8. The distance of electrodes 12 from fuel cone 8 is selected according to the desired operating performance in the respective application case of the direct injection gasoline engine 1.

Figure 2:
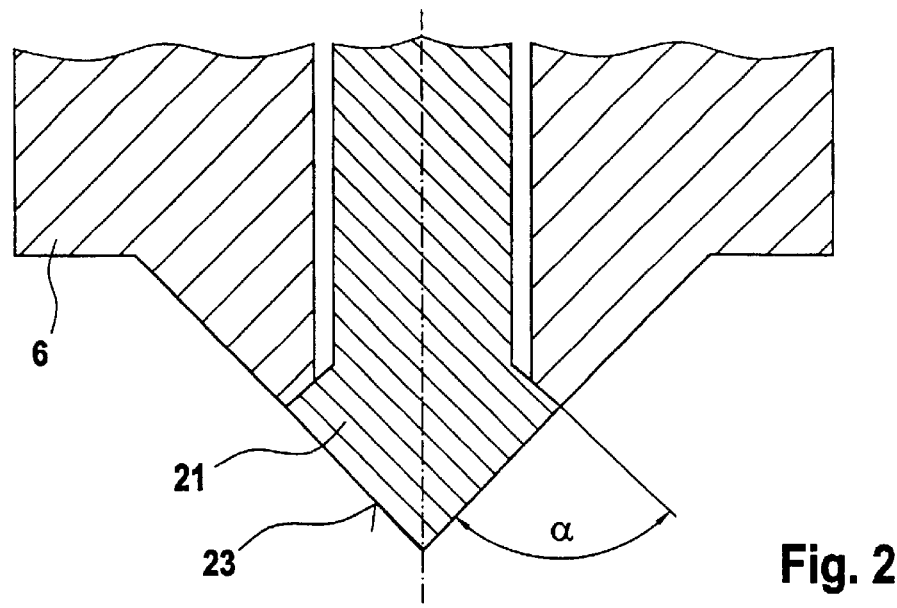
FIG. 2 is an enlarged view of an end section of the valve needle of an injector.

FIG. 2 illustrates an enlargement of the end section of injector 6 that is projecting into the combustion chamber. A longitudinally movable valve needle 21 is arranged in injector 6, which forms the sealing member of injector 6 that opens to the outside, i.e., into the combustion chamber. The tip of valve needle 21 and the valve seat of injector 6 are configured so that the fuel jet to be injected emerges from injector 6 at an angle α, which is in a range of between 70° and 110°. The fuel jet may emerge perpendicularly to the surfaces of outside edges 23 of valve needle 21, whereby a reduced sensitivity of the valve needle results relative to deposits or the coking. Angle of emergence α thus determines the cone angle of the hollow cone jet that is generated by injector 6.

Figure 3:
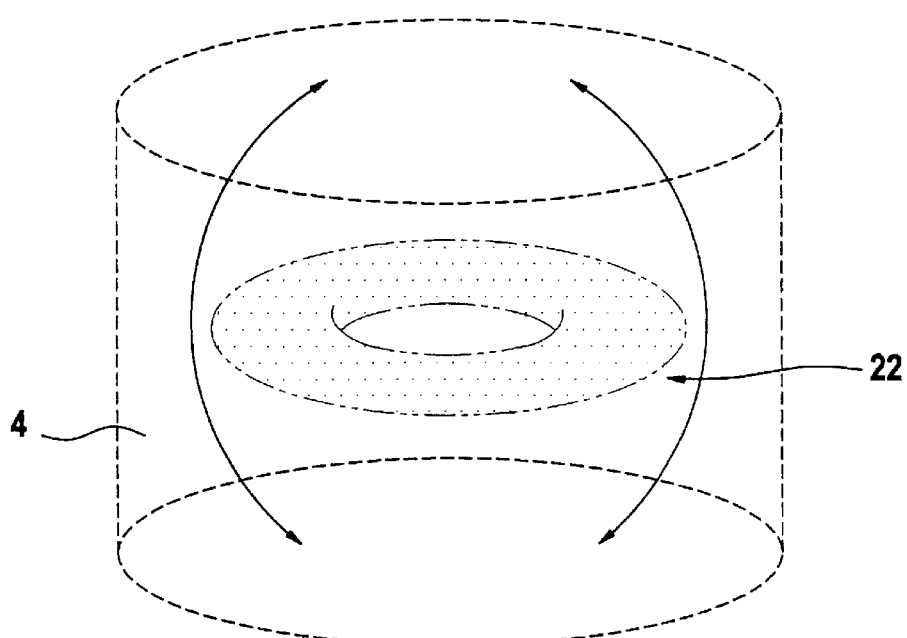
FIG. 3 is a schematic view of a position of the fuel in the combustion chamber after injection.

FIG. 3 schematically illustrates a combustion chamber 4, in which the fuel is concentrated in a toroid shape through the vortex that emerges out of the lateral surface of the fuel jet that is injected. Fuel toroid 22 moves during the mixture formation in the inner space 4 according to the flow direction of the inflowing combustion air. Tumble flow or reverse tumble flow may be advantageous, where a charging movement occurs in the direction of the arrow.

Figure 4:
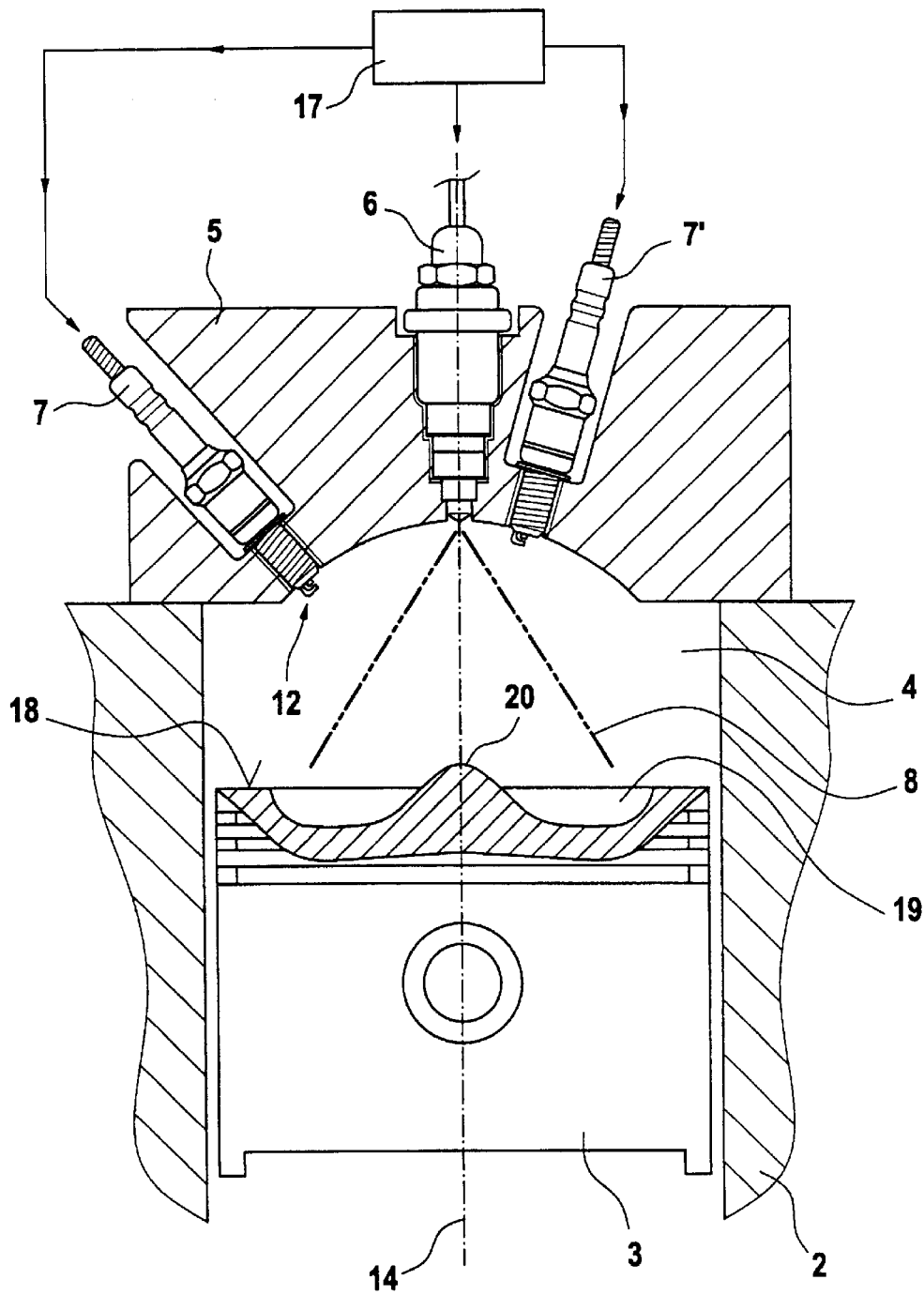
FIG. 4 is a cross-sectional view through a gasoline engine having double ignition.

FIG. 4 illustrates a n example embodiment of gasoline engine 1 according to the present invention with two spark plugs 7, 7' per cylinder 2. For simplicity, the reference indicators from FIG. 1 are provided for equivalent structural components.

Injector 6 is arranged in a central position in the combustion chamber on cylinder axis 14 and injects a hollow cone shaped fuel jet 8 into combustion chamber 4. The two spark plugs 7, 7' are arranged asymmetrically to cylinder axis 14 at different distances from injector 6 in cylinder head 5. The spark positions correspond to the respective positions of electrodes 12 of spark plugs 7, 7' and are different for the two spark plugs relative to fuel cone 8. In the characteristics map of internal combustion engine 1, different injection times may be advantageous for different load ranges in regard to the operating behavior of internal combustion engine 1. In the process, fuel vortices emerge from cone lateral surface 8 at different points depending on the operating mode (stratified charge operation/homogenous mixture formation) and the operating conditions of the internal combustion engine. Spark plugs 7, 7' are arranged according to the lateral surface zone, in which fuel vortices may occur over the entire stratified loading characteristics map of the internal combustion engine, with each of spark plugs 7, 7' being adjacent to the extreme positions of the fuel vortices in the possible cone lateral surface. In this manner, it is ensured that at each operating point with stratified charging of the internal combustion engine and under all possible operating conditions, the emerging fuel vortex may be ignited by at least one of the two available spark plugs 7, 7'.

Electrodes 12 of each of the spark plugs 7, 7' are outside of hollow cone jet 8 and are thus protected from being directly wetted by fuel. A control unit 17 may determine, as a function of the provided operating mode of internal combustion engine 1 and the measured values of the operating conditions of the internal combustion engine (e.g., rpm, load), which of the two spark plugs 7, 7' is used to ignite the fuel/air mixture in combustion chamber 4. The corresponding data for ignition control may be made available in a characteristics map memory of control unit 17, to be extracted as needed. Control unit 17 coordinates the ignition, i.e., the selection of spark plugs 7, 7' and the ignition time with the injection parameters, and controls injector 6. Ignition may occur after the end of the injection operation, for example, in a time period of between 0.1 ms and 1.5 ms after the end of the injection.

Under extreme operating conditions of the internal combustion engine, both spark plugs 7, 7' may be used in the same operating cycle of piston 3 and to ensure reliable mixture ignition via double ignition at different spark positions.

Piston 3 includes, in its piston head 18, a piston cavity 19 which supports, by a turbine blade-type contour, the formation of the fuel vortices that emerge out of fuel jet 8 and contributes, particularly in the stratified charge operation, to the stabilization of the toroid-shaped mixture cloud. Piston cavity 19 includes a central elevation 20 which extends approximately at the level of the axis of symmetry of hollow cone jet 8, i.e., it is located in a central position in piston head 18 in the combustion chamber configuration. The central elevation is surrounded by a bulb-type recess, a blade-type contour being formed for the impinging fuel jet.

What is claimed is:
1. A direct injection gasoline engine, comprising:
    a combustion chamber delimited in each cylinder by a longitudinally movable piston and an inner wall of a cylinder head;
    an injector having an injection nozzle configured to inject fuel into the combustion chamber in a cone-shaped manner to form an ignitable fuel/air mixture with separately supplied combustion air; and
    a spark plug having electrodes arranged outside a lateral surface of the cone of fuel injected by the injection nozzle and located in an area of and protruding into a mixture vortex;
    wherein the injection nozzle is configured to inject fuel in a hollow, cone-shaped free jet substantially unaffected by a combustion chamber boundary;
    wherein a cone angle of the fuel cone is between 70° and 110°; and
    wherein the injector includes an injection nozzle opening to an outside so that fuel vortices are formed substantially independently of the combustion chamber shape, emerge from the lateral surface of the injected fuel and are concentrated in the combustion chamber in a torus shape.

2. The direct injection gasoline engine according to claim 1, wherein the injector includes a multi-hole nozzle, the nozzle holes of the multi-hole nozzle being arranged to produce a hollow cone jet from individual jets emerging during fuel injection.

3. The direct injection gasoline engine according to claim 1, wherein the injector is arranged so that an angle between an axis of symmetry of the fuel cone and a cylinder axis of the cylinder is less than 25°.

4. The direct injection gasoline engine according to claim 3, wherein the injection nozzle is disposed at a distance of less than 20 mm from the cylinder axis.

5. The direct injection gasoline engine according to claim 1, wherein the injector is configured to be actuated piezoelectrically.

6. The direct injection gasoline engine according to claim 1, wherein a spark position of the electrodes is 1 mm to 15 mm from the lateral surface of the fuel cone.

7. The direct injection gasoline engine according to claim 6, wherein the spark position of the electrodes is 7 mm to 30 mm from the injection nozzle.

8. The direct injection gasoline engine according to claim 1, wherein the combustion chamber is configured to deflect inflow of combustion air in the combustion chamber to form a tumble flow in a plane that includes a cylinder axis, the spark plug being arranged in a rear section of a flow path of the combustion air in the combustion chamber.

9. The direct injection gasoline engine according to claim 1, wherein a piston head of the piston includes a piston recess having a blade contour with a projection arranged approximately at a height of a center of the fuel cone.

10. The direct injection gasoline engine according to claim 1, wherein the direct injection gasoline engine is configured to operate in wide characteristics map ranges with stratified charging and fuel injection during a compression stroke.

11. A direct injection gasoline engine, comprising:
    a combustion chamber delimited in each cylinder by a longitudinally movable piston and an inner wall of a cylinder head;
    an injector having an injection nozzle configured to inject fuel into the combustion chamber in a cone-shaped manner to form an ignitable fuel/air mixture with separately supplied combustion air; and
    a spark plug having electrodes arranged outside a lateral surface of the cone of fuel injected by the injection nozzle and located in an area of and protruding into a mixture vortex;
    wherein the injection nozzle is configured to inject fuel in a hollow, cone-shaped free jet substantially unaffected by a combustion chamber boundary;
    wherein a cone angle of the fuel cone is between 70° and 110°;
    wherein the injector includes an injection nozzle opening to an outside so that fuel vortices are formed substantially independently of the combustion chamber shape, emerge from the lateral surface of the injected fuel and are concentrated in the combustion chamber in a torus shape;

wherein a spark position of the electrodes is 1 mm to 15 mm from the lateral surface of the fuel cone;

wherein the spark position of the electrodes is 7 mm to 30 mm from the injection nozzle; and wherein the direct injection gasoline engine includes two spark plugs per cylinder.

12. The direct injection gasoline engine according to claim 11, wherein the spark position of each spark plug is the same distance from the injector.

13. The direct injection gasoline engine according to claim 11, wherein the spark position of each spark plug is at a different distance from the injector.

14. The direct injection gasoline engine according to claim 11, wherein the spark plugs are configured for dual-firing ignition.

15. The direct injection gasoline engine according to claim 11, further comprising:

a control unit configured to determine which of the two spark plugs is used to ignite a fuel/air mixture.

16. The direct injection gasoline engine according to claim 15, wherein the control unit is configured to determine which of the two spark plugs is used to ignite the fuel/air mixture based on a operating mode of the direct injection gasoline engine.

17. The direct injection gasoline engine according to claim 15, wherein the control unit is configured to determine which of the two spark plugs is used to ignite the fuel/air mixture based on operating conditions of the direct injection gasoline engine.

18. The direct injection gasoline engine according to claim 17, wherein the operating conditions include an rpm.

19. The direct injection gasoline engine according to claim 17, wherein the operating conditions include a load.

20. The direct injection gasoline engine according to claim 15, wherein the ignition is configured to occur after an end of the injection operation.

21. The direct injection gasoline engine according to claim 15, wherein the ignition is configured to occur in a time period of between 0.1 ms and 1.5 ms after an of the injection operation.

* * * * *